United States Patent [19]
Adey

[11] Patent Number: 5,851,398
[45] Date of Patent: Dec. 22, 1998

[54] ALGAL TURF WATER PURIFICATION METHOD

[75] Inventor: Walter H. Adey, Gloucester, Va.

[73] Assignee: Aquatic Bioenhancement Systems, Inc., Sugar Land, Tex.

[21] Appl. No.: 857,971

[22] Filed: May 16, 1997

Related U.S. Application Data

[63] Continuation-in-part of Ser. No. 336,746, Nov. 8, 1994, abandoned.

[51] Int. Cl.$^6$ .................................................. C02F 3/32
[52] U.S. Cl. .......................... 210/602; 210/631; 210/725; 210/906; 210/912; 210/913; 210/914
[58] Field of Search .................................. 210/602, 631, 210/725, 730, 906, 912, 913, 914, 170

[56] References Cited

U.S. PATENT DOCUMENTS

| | | |
|---|---|---|
| 2,867,945 | 1/1959 | Gotaas et al. . |
| 3,025,831 | 3/1962 | Berardi . |
| 3,122,126 | 2/1964 | Yamada . |
| 3,155,609 | 11/1964 | Pampel . |
| 3,198,171 | 8/1965 | Westphal . |
| 3,232,271 | 2/1966 | Dosamantes de Jose et al. . |
| 3,385,786 | 5/1968 | Klock . |
| 3,387,587 | 6/1968 | Kelley et al. . |
| 3,403,471 | 10/1968 | Clement et al. . |
| 3,431,200 | 3/1969 | Davis et al. . |
| 3,462,360 | 8/1969 | McKinney . |
| 3,521,400 | 7/1970 | Ort . |
| 3,557,753 | 1/1971 | Dantoni . |
| 3,565,797 | 2/1971 | Gresham . |

(List continued on next page.)

FOREIGN PATENT DOCUMENTS

| | | |
|---|---|---|
| 1008191 | 4/1977 | Canada . |
| 2694 335 | 4/1988 | France . |
| 624588 | 7/1978 | Russian Federation . |
| 2197171 | 5/1988 | United Kingdom . |

OTHER PUBLICATIONS

W. Adey, C. Luckett, K. Jensen, "Phosphorus Removal from Natural Waters Using Controlled Algal Production," *Restoration Ecology*, Mar. 1993, pp. 29–39.

"The Coral Reef, Researching a Living System," NMNH, Smithsonian Inst.

"And Live From the East Coast—a Miniature Maine Ecosystem," *Bioscience*, vol. 35, No. 10, Nov. 1985.

"A Living Coral Reef Aquarium," John Hackney, *Sea Scope*, Winter 1985, pp. 3–4.

W. Adey, "The Microcosm: A New Tool for Reef Research," *Coral Reefs*, 1983, pp. 193–201.

*Primary Examiner*—Christopher Upton
*Attorney, Agent, or Firm*—Liddell, Sapp, Zivley, Hill & LaBoon, L.L.P.

[57] ABSTRACT

A method for removing pollutants from water, according to the preferred embodiment of the present invention, comprises the steps of providing algal spores for seeding, providing a source of water for flowing through a floway, and the water contains a quantity of pollutants and has a pH on entry into said floway, providing a growing surface in the floway upon which the algal spores form an attachment, subjecting the algal spores in the floway to operating conditions resulting in the formation of an algal turf in which the algae has cell walls on its surface, adjusting the floway operating conditions such that a predetermined pollutant precipitates onto and/or into the algal cell walls but not into the water, and harvesting a portion of the algal turf including the cell walls onto and/or into which the pollutants have precipitated. By control of such floway operating conditions as water flow rate, light level, intensity and wavelength, water surge rate, recirculation rate, and nutrient concentrations, the pH of the water adjacent the algal cell wall is caused to increase to a level at which the desired pollutants precipitate. Since the operating conditions are carefully adjusted to allow the pH of the water to remain below the pH level normally required for precipitation, precipitation of the pollutants occurs only onto and/or into the algal cell wall, and not into the water column as a whole. No precipitation occurs in the water because its pH does not rise to the pH at which the pollutants of interest precipitate.

25 Claims, 6 Drawing Sheets

5,851,398
Page 2

U.S. PATENT DOCUMENTS

| | | | |
|---|---|---|---|
| 3,598,726 | 8/1971 | Welch . | |
| 3,645,040 | 2/1972 | Ort . | |
| 3,661,262 | 5/1972 | Sanders . | |
| 3,760,767 | 9/1973 | Hickey . | |
| 3,763,824 | 10/1973 | Schoon . | |
| 3,768,200 | 10/1973 | Klock . | |
| 3,780,471 | 12/1973 | Ort . | |
| 3,839,198 | 10/1974 | Shelef . | |
| 3,848,567 | 11/1974 | Garber, Jr. . | |
| 3,889,418 | 6/1975 | Porter et al. | 210/602 |
| 3,929,101 | 12/1975 | Katz . | |
| 3,955,318 | 5/1976 | Hulls . | |
| 3,957,017 | 5/1976 | Carmignani et al. . | |
| 3,973,519 | 8/1976 | McCarty et al. . | |
| 3,994,807 | 11/1976 | Macklem . | |
| 4,005,546 | 2/1977 | Oswald . | |
| 4,076,619 | 2/1978 | Howery . | |
| 4,213,421 | 7/1980 | Droese et al. . | |
| 4,228,003 | 10/1980 | Makino | 210/725 |
| 4,267,038 | 5/1981 | Thompson . | |
| 4,320,594 | 3/1982 | Raymond . | |
| 4,324,200 | 4/1982 | Johnson . | |
| 4,333,263 | 6/1982 | Adey . | |
| 4,500,324 | 2/1985 | Young | 210/725 |
| 4,698,163 | 10/1987 | Zibrida . | |
| 4,721,585 | 1/1988 | Ulderico et al. . | |
| 4,769,138 | 9/1988 | Frandsen . | |
| 4,966,096 | 10/1990 | Adey . | |
| 5,097,795 | 3/1992 | Adey . | |
| 5,120,447 | 6/1992 | Christian | 210/725 |
| 5,131,820 | 7/1992 | Jensen . | |
| 5,192,163 | 3/1993 | Fleming | 210/602 |
| 5,322,035 | 6/1994 | Hawes et al. . | |
| 5,407,576 | 4/1995 | Wolf et al. | 210/602 |
| 5,527,456 | 6/1996 | Jensen | 210/170 |
| 5,573,669 | 11/1996 | Jensen | 210/602 |

ALGAL TURF WATER PURIFICATION METHOD

RELATED APPLICATIONS

This application is a Continuation-in-Part of my prior U.S. patent application Ser. No. 08/336,746 filed on Nov. 8, 1994, now abandoned.

BACKGROUND OF THE INVENTION

The present invention provides a method for removing pollutants from water. In particular, the present invention provides a method for removing pollutants by precipitation of the pollutants onto and/or into the cells or cell walls of an algal turf growing in a flowing column of water.

Municipal, industrial and institutional sewage is generally treated today by processes including sedimentation, bacterial action and chlorination. The net result of such activities for more advanced or tertiary systems is wastewater generally free from particulate organics but still high in nutrients. Moreover, the water may still be contaminated by a variety of pollutants such as heavy metals. Attempts have been made to remove nutrients from waste waters utilizing macro or planktonic algae (Goldman et al., "Inorganic Nitrogen Removal in a Combined Tertiary Treatment Marine Aquaculture System—I. Removal Efficiencies," Water Research, volume 8, pp. 45–54 (1974)). Such techniques are directed to scrubbing coupled with control of algal growth, for example, by production of shell fish such as oysters used to remove the algae. Results to date have been mixed indicating more or less efficient nitrogen removal, but only partial success with respect to removal of phosphorus and other undesirable species.

Various systems are known for biological clean-up of polluted water or water containing high levels of nutrients such as nitrogen or phosphorus. Whether the material in the water is considered a pollutant or a nutrient, high levels of such materials are undesirable in natural water systems. Generally such systems rely either upon metabolic uptake of the undesirable species, or upon forcing the pH of the water to increase to such a high value that the undesirable species are forced out of solution, and precipitate in the water.

Algal Turf Scrubbing systems have been developed to remove nutrients and other pollutants from wastewater. My U.S. Pat. No. 4,333,263 describes the use of Algal Turf Scrubbing ("ATS") to primarily metabolically remove carbon dioxide, nutrients and other pollutants from wastewaters. My subsequent U.S. Pat. Nos. 4,966,096 and 5,097,795 describe equipment for carrying out this function.

Although Algal Turf Scrubbing, as described in my U.S. Pat. Nos. 4,333,263, 4,966,096 and 5,097,795, each of which are hereby incorporated by reference in their entirety, provided a significant level of removal of pollutants, one often requires substantially greater removal of pollutants, particularly nutrients such as phosphorus. The present invention achieves substantially greater removal of pollutants, including removal of both nutrients such as phosphorus and heavy metals, from wastewaters. Another benefit of the invention is the efficient production of nutrient-laden biomass for use as a source of animal feed, energy, fertilizer or for other uses.

An article by Adey et al., "Phosphorus Removal from Natural Waters Using Controlled Algal Production," pp. 29–39, *Restoration Ecology* (March 1993), discusses the use of Algal Turf Scrubbing to scrub the nutrient phosphorus from agricultural wastewaters. This paper, and the above-identified ATS patents, concern the role of the ATS process to remove phosphorus both through (1) metabolic uptake and (2) the physical removal of phosphorus attached to organic particulates. In these references, particulate trapping, i.e., physical removal, is accomplished within the web of algal filaments enhanced by the mucilage production of blue-green algae and diatoms.

A common and primary means for the removal of phosphorus from wastewaters, especially in the tertiary treatment of sewage, but also from agricultural wastewaters, is by chemical precipitation. However, the process of chemical precipitation is extremely expensive, requiring, e.g., the addition of lime or other pH-increasing substances and subsequent collection of the precipitated species by filtration or settling. Such precipitation may require subsequent coagulation or flocculation to collect and remove the pollutants and algae from the water column.

In U.S. Pat. No. 3,780,471, Ort discloses a water treatment method using three separate ponds, in which planktonic algae is grown in the third pond. Ort teaches pushing the growth conditions in the third pond to obtain the maximum increase in the pH of the pond. Ort discloses adding lime to further increase the pH to a value of about 11.4, in order to precipitate the maximum number and amount of chemical species. Ort teaches increasing the pH the entire water column in which the pH is raised, and Ort teaches the use of flocculation and flotation to remove the combined mass of suspended algae and precipitated chemical species. Ort's system thus requires the addition of agents to assist in removal of pollutants, which must themselves be removed from the water under treatment. Ort's method does not include removing pollutants from a wastewater by precipitating them only onto and/or into the cell walls of algae. Ort's method does not include removing pollutants from a wastewater in which substantially all the precipitation which occurs does so only onto the algal cell surface. Ort's method does not include removing pollutants from a wastewater in which the pH of the wastewater does not increase to a pH level at which the pollutant normally precipitates.

The economic efficiency of the various foregoing systems ranges widely. Where precipitation occurs as a result of an increase in the pH of the wastewater to a level at or above the pH normally required to precipitate the targeted pollutant, and the precipitated species is not collected prior to a subsequent pH reduction, the precipitated species will redissolve when the pH is reduced. Thus, in a system like Ort's, one would be required to proceed stepwise to raise the pH, collect the precipitated species by some further steps, and then reduce the pH to an ambient level suitable for discharge into a natural system. These steps would be difficult and expensive to carry out on a continuous basis. Such steps require both the addition to and removal from the water of chemicals or other materials. Thus such steps must be more expensive than a system as disclosed herein.

In my published application, PCT/US95/14317 (WO 96/13970, Intl. Pub. Date 17 May 1996), I teach generally that precipitation could be caused to occur onto the algal cell wall, in addition to the known metabolic uptake, by controlling the pH of a thin layer of water around the algal turf within a range of pH. While this disclosure forms a basis for the present invention, it does not provide for maintaining the pH below the level normally required for precipitation, nor for causing substantially all of the precipitation which occurs to occur onto the surface of or within the algal cell walls. To the contrary, my PCT application teaches that the pH of the entire column of water is increased to the specified range.

While the foregoing systems are capable of removing the undesirable species from bodies or streams of water, none of these systems provide the capability of causing substantially all of the precipitation to occur onto the algal surface such that harvesting the algae concomitantly collects the precipitated species. None of these systems provide the capability of maintaining the pH of the water as a whole at a level below which the species would precipitate due to pH. None of these systems allow for a truly continuous operation or for the removal of undesirable species in an inexpensive and efficient manner.

SUMMARY OF THE INVENTION

The present invention provides a method for removing pollutants, excess nutrients and other undesirable species from water. The method comprises the following steps. First, algal spores and a source of water for treatment are provided. The water preferably flows through a trough or floway. The water contains a quantity of pollutants, nutrients or other undesirable species and has a pH on entry into the floway such that the algae is not prevented from growing by an excessively high or low pH, and such that the pollutants, nutrients or other undesirable species are generally dissolved, although some species may be present in the form of suspended particulate matter. Within the floway a growing surface is provided, and is located in the flowing water. As the algal spores grow, they form an attachment to the growing surface. The algal spores are subjected to floway operating conditions so as to grow algae forming an algal turf in the flowing water. The algal turf naturally has a surface comprising the cell walls of the algae. As the algal turf is formed, the floway operating conditions are adjusted such that one or more of the pollutants, nutrients or other undesirable species precipitates substantially only onto and/ or into the algal cell walls. When a predetermined quantity or loading of the pollutants, nutrients or other undesirable species has precipitated onto the algal cell walls, a portion of the algal turf is harvested. The harvesting step collects both the algal turf and the pollutants, nutrients or other undesirable species precipitated thereon, thus removing the species from the water.

In another embodiment of the invention, the step of adjusting the floway operating conditions includes managing the pH of the water so that the water exiting the floway does not have a substantially increased pH relative to the pH of the water when it entered the floway. This effect may be obtained according to the invention while one or more pollutants, nutrients or other undesirable species is precipitated onto and/or into the algal cell walls. Thus, the water exiting the floway contains a decreased quantity of such species but without an increase in pH which later must be reduced in additional, costly steps.

According to an embodiment of this invention, carbon dioxide gas, which may be obtained, e.g., from a fossil-fuel power plant or from an alcohol fermentation plant, may be added to the water to maintain the pH of the water at a level below that at which the pollutants normally precipitate, and may be added to provide a source of nutrient for the photosynthesizing algal turf to increase biomass production.

According to another embodiment of this invention, removal of pollutants, nutrients and other undesirable species is enhanced by subjecting the growing surface to water surge motion.

An object of the present invention is to provide a method of removing pollutants, nutrients and other undesirable species from a stream of water while simultaneously producing a biomass, and using only adjustments of growing conditions or commonly available materials both to control the pH and to provide a source of nutrients for the biomass.

Another object of the present invention is to substantially increase the level of pollution removal that could previously be achieved with ATS.

Another object of this invention is to provide an economical method for removing phosphorus and other undesirable nutrients from wastewaters.

A further object of the invention is to provide an economical method for removing heavy metals from wastewaters.

Another object of the invention is to provide a method for producing a biomass. The nutrient-laden biomass obtained from the harvested algal turf of this invention may be used for, e.g., energy, agricultural hydroseeding, fish feed and various other uses, including use as a human food.

BRIEF DESCRIPTION OF THE DRAWINGS

The accompanying drawings, which are included to provide a further understanding of the invention, to illustrate various embodiments of the invention and, together with the description, to fully disclose the invention.

DESCRIPTION OF THE PREFERRED EMBODIMENTS

Reference will now be made in detail to the preferred embodiments of the invention. The present invention utilizes algal turfs, which are dense mats of small anatomically simple algae generally less than several centimeters (cm) in height.

The present invention provides a method for removing pollutants, excess nutrients and other undesirable species from water. The method comprises the following steps. First, algal spores and a source of water for treatment are provided. The water preferably flows through a trough or floway. The floway is any device through which water may be made to flow, an algal turf may be grown, and suitable growing and floway operating conditions may be provided. The floway preferably is a trough-like structure, having side walls elevated with respect to a water-carrying bottom portion, and having a width ranging from comparable to the height of the side walls to much greater than the height of the side walls. The side walls may be vertical and perpendicular to the bottom portion, or may curve gently from a horizontal to a vertical aspect. Such floways are known in the art.

The term "pollutants", as used hereinafter, includes pollutants, nutrients and any other undesirable species in water which are subject to removal by the method of the present invention.

The water provided to the floway contains a quantity of pollutants and has a pH on entry into the floway. Generally, the quantity of pollutants and the pH of the water on entry into the floway are such that the selected algae is not prevented from growing by either an excessively high load of pollutants or an excessively high or low pH. Furthermore, the pH of the water on entry into the floway is such that the pollutants are generally dissolved, although some pollutants may be present in the form of suspended particulate matter.

Figure 1:
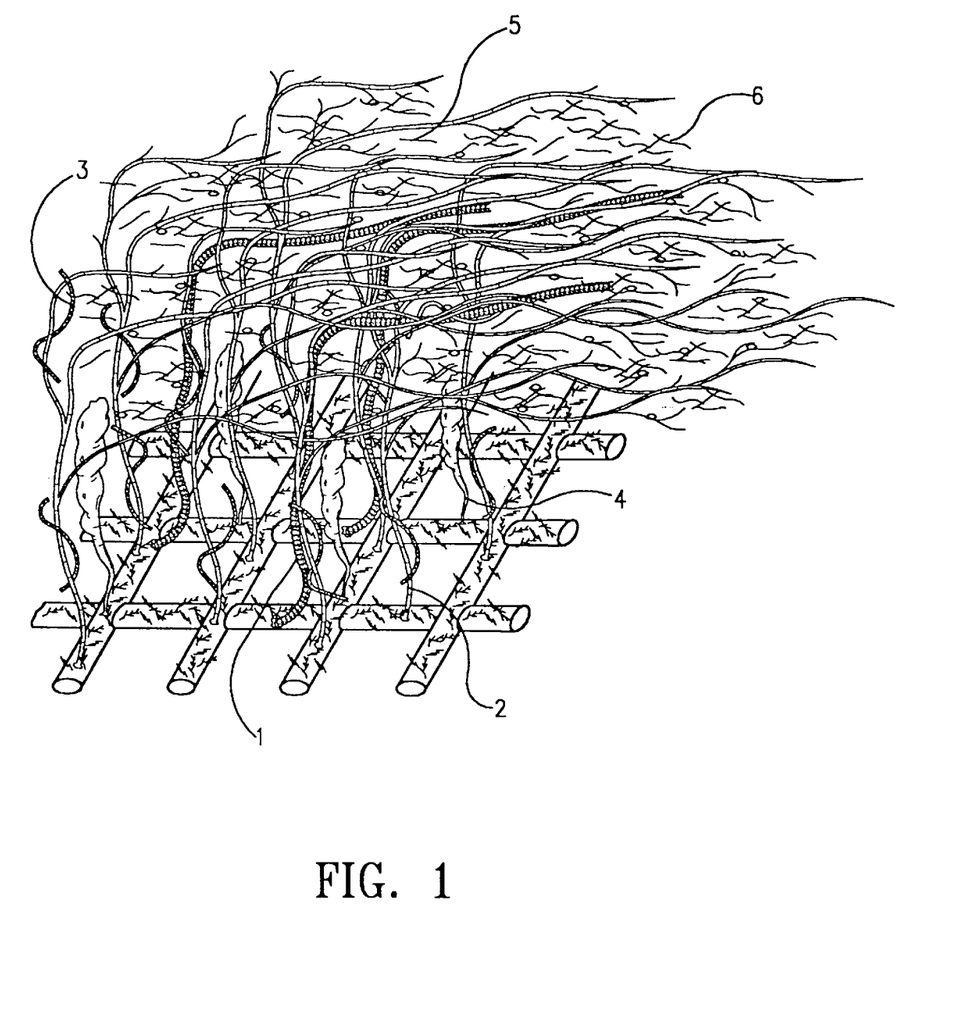
FIG. 1 is a schematic drawing of one embodiment of an algal turf in accordance with this invention.
Figure 2:
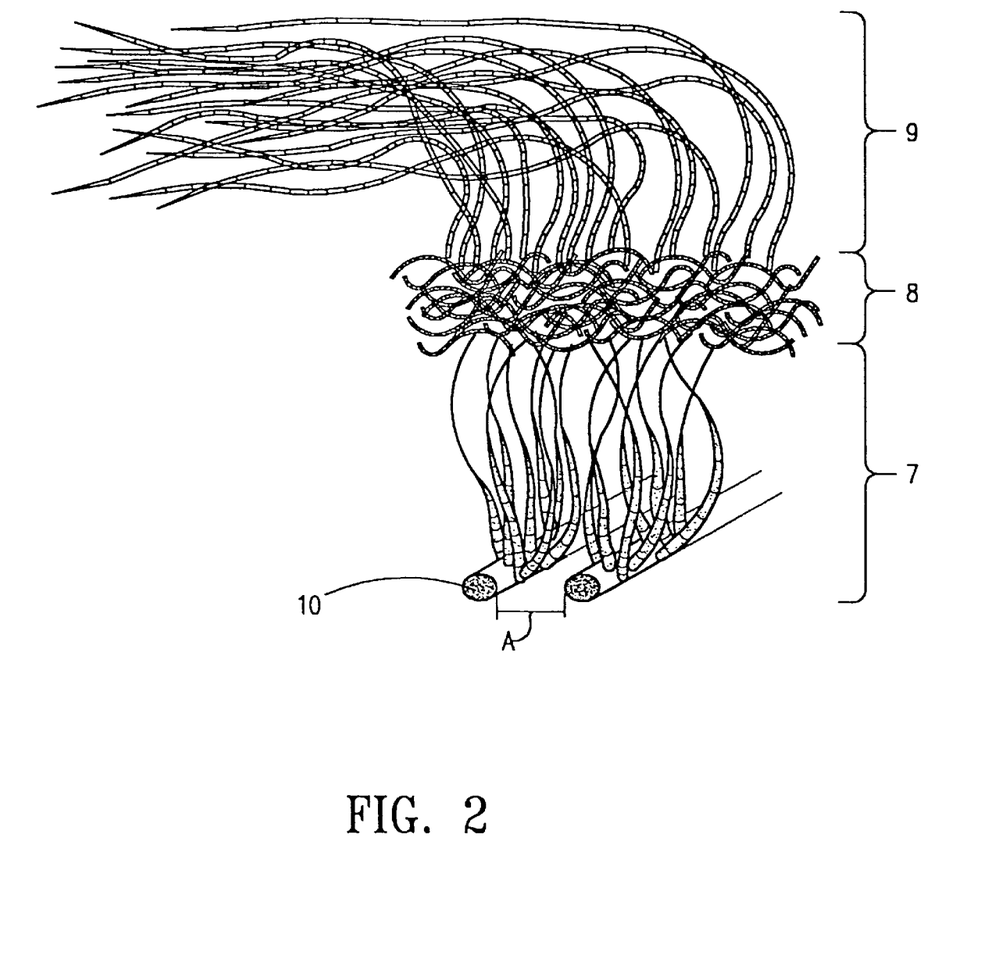
FIG. 2 is a schematic drawing of another embodiment of an algal turf comprising a microalgae in accordance with this invention.

The following paragraphs are best understood with reference to FIG. 1. Within the floway a growing surface 10 is provided, and is located in the flowing water. The growing surface 10 is preferably a material with a large surface area to facilitate attachment of the algal spores, and when the growing surface is separate from the bottom portion of the floway, it is preferably a material with a specific gravity greater than that of water so that it remains submerged in the water, and, preferably, in contact with the bottom portion of the floway. As the algal spores grow, they form an attachment to the growing surface 10, as shown in FIGS. 1 and 2.

Figure 8A:
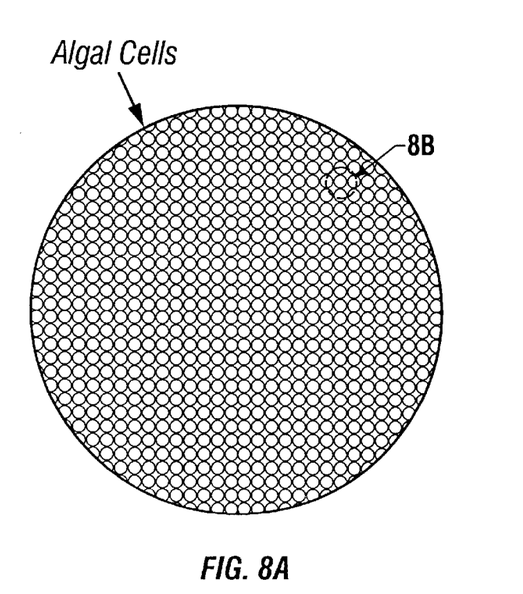
FIG. 8 is a highly schematic diagram of a community of algal cells and a blow-up of an algal cell surface, showing the overlapping and intertwined microfibrils which form the outer surface of the algal cell wall.
Figure 8B:
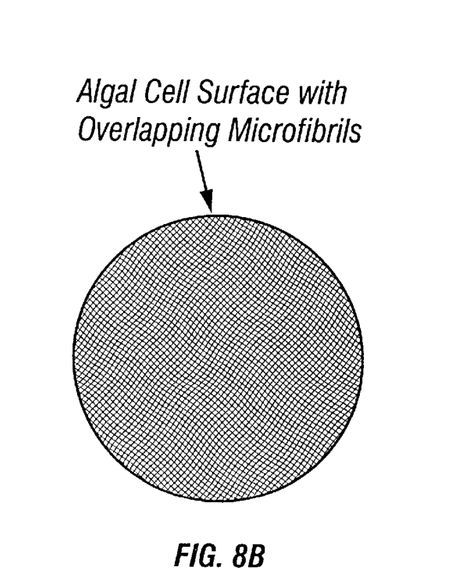

The algal spores are subjected to floway operating conditions so as to grow algae which become attached to the growing surface 10 and form an algal turf in the flowing water. As better shown in FIG. 4, the algal turf is comprised of algal cells, each naturally having a surface comprising cell walls. A schematic depiction of an algal cell wall surface is shown in FIG. 8, to show the multiplicity of open algal cell walls and the porosity of each cell wall due to the overlapping and intertwining microfibrils from which the cell wall is formed.

As the algal turf is formed by growth of the algae, the floway operating conditions are adjusted such that one or more of the pollutants precipitates substantially only onto and/or into the algal cell walls. The floway operating conditions which may be adjusted primarily include the level of light incident upon the algal turf, the water temperature, the water pH, the flow rate with which the water flows through the floway, the concentration of nutrients, the proportion of the water that is recirculated, and the degree of water surge. These and possibly other floway operating conditions may be adjusted such that the pollutants are induced to precipitate from the water onto and/or into the algal cell walls.

The water has a pH when it enters the floway. In the preferred embodiment of the present invention, the pH of the water does not substantially increase as a result of its travel through and treatment in the floway. In some cases, this may be accomplished by allowing the pH of some portion of the water to increase slightly so as to cause precipitation, and then to decrease to ambient levels by virtue of the turbulence and mixing action with the surrounding atmosphere and the remaining portion of the water. This effect is more preferably obtained when the water passing through the floway is subjected to a water surge, which increases the turbulence and mixing of the water in the floway. In other cases, a material which lowers the pH may be added to the water. The most preferred such material, when any is employed, is a gas containing carbon dioxide, preferably from a source such as exhaust from a combustion process or the by-product from an alcohol fermentation process. Fermentation of sugar by yeast produces as the by-product a weight of carbon dioxide approximately equal to the weight of ethyl alcohol produced. Such sources do not require additional expenditures for manufacture of the carbon dioxide or obtaining other agents for lowering the pH of the water. In addition to lowering the pH, addition of carbon dioxide provides additional quantities of an essential nutrient to the algal turf.

When a predetermined quantity or loading of pollutants has precipitated onto and/or into the algal cell walls, a portion of the algal turf is harvested. The harvesting collects both the algal turf and the pollutants precipitated thereon. Thus, the net effect is that the water to be treated has passed through the algal turf, deposited its pollutants onto and/or into the cell walls of the algal turf, and has been discharged with no overall substantial increase in pH.

The phrase "precipitates . . . onto and/or into algal cell walls" herein shall be understood to mean that the pollutant is precipitated onto the surface of and/or into the pores of the cell walls or may be metabolically taken into the cells of algae that are porous in nature. The phrase "precipitates . . . onto and/or into the cell walls" further includes that particles of the pollutants suspended in the water may be trapped in mucilage secreted by the external cell walls of multilayered algae that may be present in the algal turf. The phrase "precipitates . . . onto and/or into the cells or cell walls," and equivalents of this phrase used herein, means that the precipitation of pollutants may take place at various locations within the highly porous and irregular cell surface of an algal cell. The term "substantially only onto and/or into the cell walls of the algae" means that while almost all P is removed by this route in the preferred pH range some small amount, perhaps a few percent, of the P may precipitate into the water, rather than onto and/or into the cell walls of the algae, within the meaning of this term as used herein. The "substantially only" portion of this term is more fully understood with reference to FIG. 7, and is discussed more fully below.

FIG. 8 is a highly schematic depiction of the cell surface of an algal cell, and shows the highly porous and irregular cell surface. In the green algae, which constitute the preferred species and biomass in ATS systems for waste water treatment, the cell walls comprise overlapping and intertwined layers of microfibrils of cellulose, such as schematically depicted in FIG. 8. The layers can be numerous, the fibrils may be loosely wound and may be laid down in a plurality of orientations, forming gaps and spaces of various sizes relative to the fibrils and the overall surface area. These features are schematically shown in FIG. 8. These factors result in a considerable porosity of the cell surface. Applicant incorporates by reference the information on algal cell surfaces in Dodge, J., *The Fine Structure of Algal Cells*, Academic Press, New York (1973), which demonstrates the porosity and irregularity of the algal cell surface.

The water or wastewater from which pollutants may be removed according to the present invention includes: water from sewage of a wide variety of types and qualities; municipal run-off from, for example, streets and parking lots; mining effluents contaminated with heavy metals and other elements; food processing wastewaters; water from aquaculture systems that include closed system operation, and effluents from aquaculture systems generally; industrial wastewaters having a broad range of pollutant concentration and type; and agricultural wastewaters of all types, especially including many pollutants from diffuse pollution sources (as opposed to point sources) that are too costly for current control methods. The invention is, of course, also applicable to point source pollutants from any of the foregoing sources or others.

The system of the present invention may be open or closed. An open system passes the water from a source through the floway and into a natural body of water or other disposal location, and the treated water is not further encountered by the system. A closed system is one, such as an aquaculture farm, in which the same body of water is recirculated repeatedly. The water in a closed system may from time to time be replenished from other sources, and from time to time some of the water in the closed system may be discharged and not further used.

Figure 3:
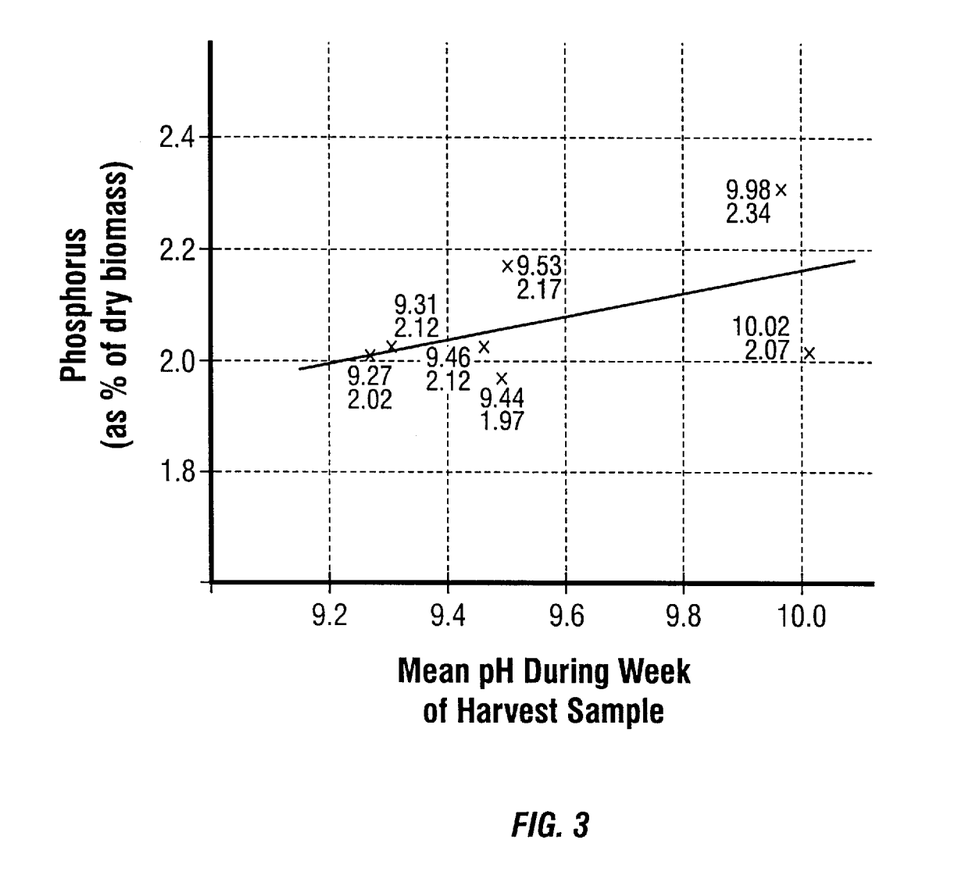
FIG. 3 is a graph showing the effect of pH on phosphorus precipitation on the algal walls in accordance with this invention.

The pollutants removed from such waters include, for example, phosphorus. When the floway operating, or growing, conditions are adjusted such that the pH of some portion of the water increases slightly according to the method of the invention, rapid precipitation of, e.g., calcium phosphate in the form of a mineral hydroxyapatite and/or other organic and inorganic complexes occurs. The pH range at which precipitation occurs depends upon the particular chemical species being precipitated, and may range from about 8.5 to about 10.5. The precipitation of phosphorus and other pollutants according to the method of the present invention is most preferably not into the flowing water or to the bottom of the floway or basin, but rather only onto and/or into the cell walls of the algae forming the algal turf. It is therefore removed when the algae is harvested. As is known from Adey et al. (1993) and Adey and Loveland, *Dynamic Aquaria,* Academic Press (1991), typical phosphorus metabolic uptake and storage in algae is at values of 0.05% of dry weight for low phosphorus concentrations (in the ambient water) and reaching a maximum of 0.4% at elevated concentrations. In contrast, as FIG. 3 shows, at the pH levels according to the invention the dry weight composition of phosphorus ranges upward to about 2% and higher. Accordingly, an algal turf scrubbing system, operated appropriately according to the method described herein to cause precipitation of pollutants only onto and/or into the algal cell wall, produces a major new method for the removal of wastewater contaminants. Precipitation onto and/or into the algal cell walls in an ATS system is thus accomplished by control of the operating conditions of the floway. The present method applies to a number of contaminant chemical elements, but phosphorus is used as an example since the removal of phosphorus presently has a strong environmental and economic demand.

Pollutants which may be removed from wastewater according to the method of the present invention, in addition to phosphorus, include calcium, magnesium, iron, barium and sulfur. These may be removed by precipitation onto and/or into the walls of the algae at the appropriate pH of precipitation for these species and thereby removed from the wastewater.

It has long been known that growing algae have the capability of taking up and concentrating many heavy metals (Green and Bedell, 1989). Algal turfs are capable of removing heavy metals, including cadmium, chromium, nickel, lead, mercury, copper and zinc from wastewaters by adsorption (ionic linking) into the ionically-charged interstices of cell walls. While some of the heavy metal removal is by metabolic uptake, it is recognized that cell wall adsorption through uptake by ionic charge characteristics of the cell wall is primarily responsible. Dead and properly prepared algal cell walls will accomplish this heavy metal removal function, but costs are very high. The ATS process according to the invention is an inexpensive and considerably more efficient means of accomplishing this critical requirement of some wastewaters.

The algal scrubber process can maintain model ecosystems and wastewaters at acceptably low levels of heavy metals as long as spike additions are not at levels that are toxic to the algae. Some pollutants in the form of elements and compounds that may be precipitated from water according to the present invention are indicated below:

Alkaline Earth Metals
  Magnesium, Calcium, Strontium, Barium
Heavy Metals
  Titanium, Chromium, Molybdenum, Nickel, Copper, Zinc, Vanadium, Mercury, Cadmium
Metals
  Manganese, Iron, Cobalt, Lead, Boron, Aluminum
Prime Nutrients
  Phosphorus, Sulfur, Carbon, Nitrogen Most wastewaters are complex mixtures of contaminants. If each contaminant must be removed by a separate process, costs are very high. ATS, according to the invention, is a very broadly applicable, nearly universal, contaminant removal process.

Figure 4:
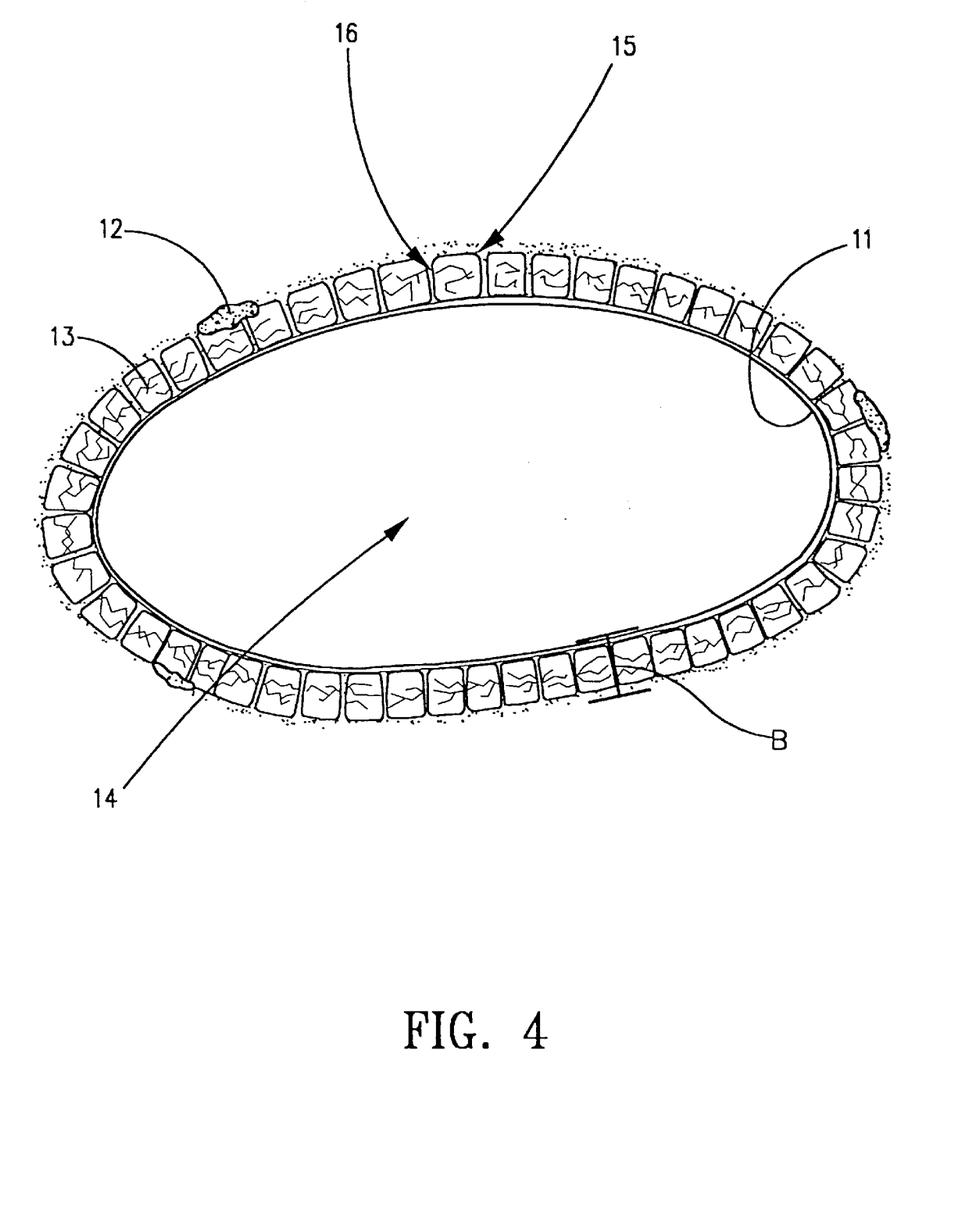
FIG. 4 is a schematic illustration of an algal turf showing the cells of which the algal turf is formed, with a precipitated pollutant on and within the cell wall.

FIG. 4 shows a schematic drawing of an algal cell of a microalgae. The algal cell consists of a cell wall represented by the width (B), a cell membrane (11), a lipid/protein (12) embedded in the cell wall, and cellulosic material (13). As depicted in FIG. 4, whereas in prior ATS processes the removal of pollutants was substantially only by metabolic uptake (14) into the algal cell interior, according to the present invention, precipitation of pollutants occurs onto (15) and/or into (16) the algal cell wall, but neither with precipitation into the flowing water nor with a concomitant increase in the pH of the water above the level normally resulting in precipitation of the particular pollutant.

As embodied herein and referring to FIG. 1, the growing surface to which the algae are attached consists of any suitable vacant area or substrate on which algae spores may settle and become attached. Immediate regrowth of the algal turf will occur if the vacant surface or substrate is sufficiently coarse to allow the filamentous base of the algae to remain following harvesting. Preferably, the growing surface is moveable relative to the floway, and provides substantially greater surface area on which the algal spores may attach, than would the floway alone.

FIG. 1 shows a schematic drawing of primary algal turf species growing on a growing surface according to the preferred embodiment of the invention, typically a plastic screen. The algal turf species in FIG. 1 include (1) *Compsopogon coeruleus,* (2) *Cladophora crispata,* (3) *Spirogyra rivularis,* (4) *Enteromorpha micrococca,* (5) *Eunotia pectinalis,* and (6) *Melosira varian,* although many others are listed below and in the previously cited patents. In FIG. 1 the very small branched alga attached directly to the screen is *Stigeoclonium tenue,* while the numerous small ovoid shapes in the algal canopy represent several small pennolean diatoms, particularly Amphora and Cocconeis spp. The algal growth of the listed groups is random on the growing surface, preferably with wave action passing across and through the turf and thus enhancing metabolite cellular-ambient water exchange. The use of a screen, preferably plastic, as a growing surface 10 has achieved optimum results, although other surfaces known in the art can be used. Typically, such a growing surface can be a plastic screen having screen grip dimensions in the range of approximately 0.5 to 5 mm. It should be plain to those familiar with algae that the above-identified genera and species are all attached, as opposed to planktonic, algae.

Algal turf growth can be achieved in an aqueous environment by providing any suitable vacant area in which spores may settle. Most preferably, the algal turf is grown in a trough or floway. The water entering the floway may come from any source of water. Preferably the water contains at least one undesirable pollutant.

The first colonizations are usually microscopic diatoms or blue green algae (cyanobacteria) which are then rapidly dominated by the turf species. In accordance with the present invention, the harvesting of such turfs preferably occurs before the turf species are overgrown in turn by the larger macroalgae. The preferred harvest interval ranges from about one to about four weeks. This harvest timing keeps production rates at a high level and minimizes predation by grazing microorganisms. The rate of harvesting is dependent on nutrient levels, light levels, temperature and surge action, and perhaps other floway operating conditions.

As mentioned above, regrowth of the algal turf will be facilitated if the newly harvested surface is sufficiently coarse to allow the filamentous base of the algae to remain following harvesting. Alternately, all algae can be removed and the growing surface "seeded" with new algal spores. Though this process is slower, it is valuable in special cases, for example, when necessary for micrograzer control, after a shut down of either the floway, or of the source generating the water, for repairs, power loss, etc.

Using screens as the growing surface, harvesting can be accomplished by simply scraping the surface or, in the context of artificial growing techniques, the screen can be set up for removal from the floway for harvesting. Vacuum harvesting techniques can greatly decrease labor. In addition to the use of screens, other growing surfaces can comprise, for example, any rough surface on which algae can grow.

As used herein, the term "algal turf" and its derivatives refers to a colony of attached microalgae and/or smaller macroalgae and/or spores of the microalgae or smaller macroalgae. The term "microalgae" refers to algae that are generally smaller than approximately 2 centimeters in height or length. Examples of such algae may be found in U.S. Pat. No. 4,333,263, previously incorporated herein by reference. The term "smaller macroalgae" refers to algae that are smaller than approximately 20 centimeters in height or length. Examples of such algae include Gracilaria (a red algae), Sargassum, and Dictyota (brown algae). Benthic microalgae or a colony dominated by such algae are preferred. In certain usage, however, a colony in which a significant percentage or even the majority of the algae are smaller macroalgae may be preferable, particularly where long harvest times are desirable for operational reasons or a coarse diatom-supporting mesh work is desired because of pollution in the form of a high percentage of larger organic particulates.

The present invention utilizes microalgae for growing the algal turf such as depicted in FIG. 2. The microalgae of FIG. 2 is shown attached to a 1 mm screen filament (10) with a 2 mm mesh (A) and consists of a basal layer (7) attached to a plastic screen, a mid-layer, or "mucilage" layer (8), and a "canopy" layer (9). Microalgae are anatomically simple and belong to all major groups of benthic microalgae. In accordance with the present invention, some prolific groups of algae for use in low to moderate salinity wastewater are indicated below:

Cyanophycota (Cyanobacteria)—Blue Green Algae
    Oscillatoria, Lyngbya, Schizothrix, Chroococcus Calothrix Chlorophycota—Green Algae
    Ulothrix, Enteromorpha, Spirogyra, Cladophora, Dichotomosiphon, Stigeoclonium, Oedogonium, Mougeotia, Gloeocystis Chromophycota—(mostly, in this context, Diatoms)
    Melosira, Ctenophora, Asterionella, Eunotia, Amphipleura, Cocconeis, Placoneis, Rhoikoneis, Bacillaria, and others Rhodophycota—Red Algae
    Compsopogon In waters of brackish to higher salinities, such as that of estuaries, coastal waters, or seawater, the genera Polysiphonia, Herposiphonia, and Callithamnion, among others, are also important.

Accordingly, for growing the algal turf, the present invention utilizes major groups of benthic microalgae. Preferably, the benthic microalgae for practicing the present invention are selected from the group consisting of green and blue-green algae for low to moderate saline waters (0–10 ppm) and including red and brown algae for high saline waters. The brown algae include diatoms. More preferably, the algae are selected from the group comprising green and red algae for low-to-moderate salinity waters. The microalgae spores for growing such benthic microalgae can be obtained as described in the previously cited patents or can be maintained as described in detail by Adey and Loveland, 1991.

The growing surface of the algae is subjected to the floway operating conditions, including, e.g., provision of light, addition of nutrients, addition of pH adjusting materials, application of water surge, adjustment of water flow rate and water recirculation rate, adjustment of water temperature, and possibly other conditions, so as to promote the growth of the algal turf. Lighting to carry out this process may be either natural or artificial. If artificial light is used, metal halide lighting is most efficient, but fluorescent lamps can also be used as an effective artificial light source. Also, as one in the art would understand, the light wavelength, intensity and duration can be varied to affect growth of the algal turf and to achieve the growth rate desired.

The use of this invention for pollution scrubbing is dependent on incipient light levels. Studies of the previously known ATS systems have indicated that in the context of a reef microcosm environment, approximately 6 g/m$^2$/day of dry algal biomass can be produced at a light level of 200 $\mu$E/m$^2$/sec with a nutrient level of 5 $\mu$M (N—NO$_3$). About 12 g/m$^2$/day of dry algal material have been harvested at light levels of 500 $\mu$E/m$^2$/sec and nutrient levels of 1–2 $\mu$m (N—NO$_3$). Phosphorus concentration in these harvested algae is less than about 0.5% of dry weight of algae. Studies on actual productive reefs indicate that production of dry algal biomass is directly proportional to light intensity at levels up to about 1200 $\mu$E/m$^2$/sec. At high light intensities and high nutrient levels of wastewater an improvement in the growth rate on the order of 20–40 g(dry)/m$^2$/day occurs. Moreover, when floway operating conditions are adjusted such that the pH of the water is elevated to a level sufficient to cause phosphorus to precipitate onto and/or into the algal cell wall, algal harvest production is increased to 50–70 g (dry)/m$^2$/day at 2000 $\mu$E/m$^2$/sec and the phosphorus level in the harvested turf is increased to at least about 2% of dry weight, an increase of up to 300% and higher over the phosphorus removal efficiency attributable to metabolic uptake alone.

Artificial light may be used to provide continuous photosynthesis. The application of artificial light, together with adjustment of water flow rate, are the more preferred ways in which the floway operating conditions may be adjusted to provide the benefits of the present invention.

In practicing the present invention, the floway operating conditions are adjusted such that while the pH of the water does not reach the level normally required for precipitation (referred to herein as the pH of precipitation), but a targeted, predetermined pollutant precipitates substantially only onto and/or into the algal cell wall. The adjustment of the floway operating conditions does not cause the pH of the water to increase to or above a level normally required for precipitation of particular species in the water. At higher pH levels algal production becomes unduly limited by a lack of available carbon. It is also known that the pH of the water may rise to a very high level, e.g., to pH 11 or more, if floway operating conditions are pushed sufficiently, such as was disclosed by Ort in U.S. Pat. No. 3,780,471. Such high pH values result in excessive precipitation of numerous chemical species into the water and much less onto and/or into the algal cells. The problems with this result are the difficulty and expense of collecting the precipitated species from the water into which the precipitation has occurred.

In contrast to Ort's method, I have surprisingly discovered that in an ATS floway, the floway operating conditions may be adjusted such that rapid precipitation of pollutants occurs only onto and/or into the cells or cell walls of the algae, rather than into the water, and the pH of the water is not allowed to increase, and that this can be achieved without addition of substantial amounts of costly chemicals or additional process steps.

Due to the highly variable nature of water systems which may be treated by the present method, and due to the variety of algal species which may be utilized to form the algal turf, a certain amount of experimentation may be required in order to obtain the optimal benefits of the present invention when the method is applied to a body or source of water not previously subjected to the present method, or one in which the concentration of pollutants has substantially changed from previous treatments.

Most ionic species are soluble in water at some pH's and insoluble at other pH's. Many species considered to be pollutants, such as phosphate ($PO_4$), are soluble at lower pH, but precipitate at an elevated pH. The exact pH at which a particular species precipitates is characteristic of each species for a given water, and varies depending upon factors such as salt content and temperature of the water. The pH above which precipitation normally occurs may be referred to as the pollutant's "pH of precipitation." The "pH of precipitation" is the pH level normally required for precipitation of a particular species in a particular water. The present invention includes adjusting floway operating conditions such that the pH of some portion of the water immediately adjacent the algal cell exceeds the pH of precipitation of the particular pollutant of interest. When this occurs, the pollutant precipitates. The precipitation occurs so close to the algal cell surface that the precipitant is deposited onto and/or into the algal cell wall or surface. Only an exceedingly small volume of water undergoes this pH change at any one time. Subsequently, when this small volume of higher pH water is mixed with the relatively turbulent flowing water with its lower pH, the dissolved gases in the water column quickly return the pH to ambient levels. Thus, the pH of the water does not substantially change, and remains below the pH normally required for precipitation, while at the same time the quantity of at least one pollutant in the water column has been decreased. By "substantially change" it is contemplated that the pH has not been increased sufficiently that the pH of precipitation for any pollutant is reached or exceeded, at which pH the pollutant would precipitate.

Such pollutants as calcium phosphate and, for example, complexes of phosphorus with iron, sulfur and magnesium (depending upon the composition of the ambient water), as well as with hydroxides and lipids, are particularly affected in the pH range of about 8.5 to about 10.5. Further, at such elevated pH levels not only phosphorus is removed, but also, depending on the components of the water, calcium, magnesium, iron, barium and sulfur, as well as a host of heavy metals which with the present invention can be more economically removed from the wastewater because of the increase in concentration in or on the removed algae, as compared to strictly metabolic removal and particulate trapping. The key factor is adjustment of the floway operating conditions such that the desired precipitation is obtained, while the pH of the water remains substantially unchanged. Thus, the pollutants precipitate close to the cell walls of the algae, the precipitation of the pollutants occurs substantially only very close to or within the cell or cell wall, thus resulting in precipitation of the pollutants only onto and/or into the cell or cell wall of the algal turf, and not into the water column as a whole.

Adjustment of the floway operating conditions such that the pH of the water increases sufficiently to cause precipitation of the pollutants onto and/or into the algal cell wall can be accomplished by the management of various parameters. The most significant operating variable is light. Preferably light duration is varied by, for example, reducing or increasing the light period between, for example, 14 hours and 8 or 9 hours per day. The duration further may be increased up to 24 hours per day by application of artificial light sources of appropriate wavelength and intensity. The intensity of light can be increased or decreased, and the wavelengths of light can be adjusted by means of filters or added sources of, e.g., UV light.

A significant operating variable may be the condition of water, including such parameters as its salinity, temperature, and nutrient or pollutant loadings. The water flow rate through the floway may be varied by using, for example, an adjustable flow pump, or an adjustable weir. Adjustment of the floway operating conditions may be accomplished by varying water surge rate and intensity, such as by using a dump scrubber (U.S. Pat. No. 4,966,096 and Adey and Loveland, 1991), and by varying the algal turf harvest rate. Additional nutrients, such as carbon dioxide, may be added to the water in order to provide more rapid growth of the biomass of algae or to adjust the pH of the water or both. Adjustment of one or more of these floway operating conditions may be used to vary the pH of a small portion of the water so as to cause precipitation to occur onto and/or into the algal cell walls. For example, the pH of the water may be effected by these and other adjustments: reducing flow increases pH, increasing light increases pH, while increasing surge first increases and then lowers pH. Also, the buffering effect of water salinity and closed system volume is important to pH.

One way in which the operating conditions can be adjusted so that the pH of the water remains at a level below the pH of precipitation of the pollutants is by addition of carbon dioxide to the water. The addition of carbon dioxide is preferably adjusted, like the other floway operating conditions, to allow the pH of some portion of the water to increase to a level slightly above the pH of precipitation of the targeted, predetermined pollutants, while at the same time maintaining the water at a pH lower than the pH of precipitation of the pollutants of interest. This adjustment of floway operating conditions acts to cause the precipitation to occur only onto and/or into the algal cell wall. Addition of carbon dioxide allows the operator of the floway to more responsively control and maintain the pH of the water.

The pH of the water can be adjusted by contacting the water with a variety of gases containing carbon dioxide.

Such gases containing carbon dioxide can be derived from, for example, stack gases from a fossil-fuel burning facility. Preferably, the gas contains a high percentage by volume of carbon dioxide and minimal other contaminants for most efficient water quality improvement. The gas may be substantially pure carbon dioxide. Such carbon dioxide may be obtained as a by-product waste gas from an alcohol fermentation plant, for example. Using waste gases including carbon dioxide provides the advantage of a secondary objective, i.e., scrubbing of $CO_2$ from stack gases or capturing $CO_2$ from fermentation processes, both of which would otherwise be released into the atmosphere.

After the precipitation of pollutants, the pH of the water does not need to be readjusted, even if it has increased slightly in the floway. In a simple, short term storage environment the pH of ATS effluent will drop to 7.0 to 8.0 (depending upon salinity) by uptake of atmospheric $CO_2$.

The floway may be operated at varying flow rates during the 24 hour period of each day, as determined by ambient light levels. In this variation of the method of the invention, the flow rate is varied in a direct proportionality with the natural, ambient light levels. At night the flow is reduced to a minimum level sufficient to prevent desiccation of the algal turf. At the sun rises and light levels increase, the flow of water to the floway is gradually increased. The increase continues until the maximum flow is reached. Later in the day, when the light begins to wane, flow levels are once again reduced until the minimum level is again reached. The preferred method for determining the flow rate is to monitor the pH of the water flowing out of the floway. If the pH of this water increases, the water flow may be increased accordingly to maintain a relatively constant pH between the influent and the effluent. A system can be envisioned in which the pH of both the influent and effluent is monitored and an automatic control system adjusts the flow rate of the influent water to maintain a relatively constant pH in the effluent water. This embodiment may be employed where it is not necessary to continuously treat a flow of water, for example, where the water may be impounded for subsequent treatment during daylight hours.

Alternatively, the floway may be continuously operated at a relatively constant flow rate, 24 hours a day, if artificial light is employed to drive the photosynthesis of the algal turf. In this embodiment, the light level is adjusted during the course of the 24 hour day to maintain a constant intensity of light during the 24 hours. During the daylight hours, little or no artificial light need be added, whereas at night, all of the light is artificial. Some experimentation would be necessary to optimize the wavelength and intensity of light for a given algal turf population and geographical location, but once the optimum was determined, the system will operate for long periods without maintenance. In this embodiment, for a given water source, once the light level has been determined at which the pH of the influent and effluent remain approximately equal, the pH need not be monitored as a means of controlling the water flow. This embodiment is particularly useful where water must be treated continuously, rather than intermittently or in a batch process, for example where no large impoundment is available. This embodiment is useful in a closed loop system in which the algal turf is being employed to remove a waste such as from a farm, and the treated water is recycled for repeated use. A system may be envisioned in which the ambient light level is monitored and additional artificial light is brought to bear upon the algal turf as needed to attain and maintain an optimum light level.

Another embodiment of this invention involves subjecting the growing surface to water surge to enhance the exchange of metabolites between algal cells of the types of algae listed above and the water media. The combination of attached algal turfs utilizing such simple algae wherein nearly every cell is photosynthetic with water surge is important for metabolite cellular-ambient water exchange and, thus, optimization of such water surge is generally desired. In the absence of wave action and/or water surge, a drop in turf photosynthesis occurs. The water surge boosts the efficiency of the photosynthetic mechanisms by serving as a small scale mixing agent of the water in the boundary layer surrounding the algal cell surface and by light "flashing". Algal turfs do not light-saturate at normal levels of solar energy. Rather, algal turfs are "sun plants" and can use all the sunlight energy they can get. Thus surge action enhances metabolic uptake by increasing algal production. Where the need for precipitation of pollutants exceeds the need for metabolic uptake of them, the surge action may be reduced to near zero. In the preferred embodiment, both the precipitation and the metabolic uptake routes of pollutant removal are employed and surge action is generally desired.

Water surge, for example oscillatory water motion, can be obtained in a variety of ways. In an oceanic environment, oscillatory water action is a function of wave motion and may or may not be controlled by attached devices. In the context of mechanical wave generators, oscillatory water surge together with flow rate can be readily controlled. The water may be pumped or allowed to flow into the floway in pulses. Water surge can also be created by moving the growing surface relative to the water, although variation of water flowing under the force of gravity is more efficient and less costly to control than pumped water.

According to the present invention, a portion of the algal turf is harvested after pollutants, such as phosphorus, have precipitated onto and/or into the cell walls of the algae forming the algal turf. The harvested algal turf may contain at least 2.0% phosphorus, for example, per unit dry weight of algae. When phosphorus is precipitated according to the invention, the harvested algal turf may comprise at least 1.5% phosphorus in the form of phosphate precipitated on the walls of the algae. In addition, if phosphorus in the form of particulates is in the water, adjustments may be made to algal biomass and/or composition to also trap the particulates. Such trapping would increase the phosphorus content of the harvested algal turf in some situations to about 5% of dry weight. A significant portion of the phosphate obtained is attributable to the site-specific precipitation action provided by the method of the present invention. The actual level is a function of many variables, including concentration in the wastewater, the relative particulate versus dissolved concentration of the phosphorus, and how the floway operational parameters are controlled. However, of the 5% dry weight maximum amount cited, approximately 0.5% is due to metabolic uptake, at least 2.0% due to precipitation, and at least 1.5% due to particulate trapping. Clearly, the precipitation element is very important to the efficiency of pollution removal on a large scale.

In performing the harvesting step, it is preferred that filamentous bases of the algae remain on the growing surface. Harvesting rates are a function of, inter alia, flow rate, screen or platform size, and light intensity, as described by Adey and Loveland. Such harvesting can occur at regular intervals in the range of from about one to about two weeks, but may be at greater intervals, depending on factors such as available sunlight and water flow. Generally, care must be taken to prevent the macroalgae from overgrowing the turf or the scrubbing efficiency of the system will decrease significantly. The harvesting interval can be adjusted in accordance with biomass developed to optimize scrubbing rates for particular targeted compounds. For example, long harvest intervals may result in a gradual rise in pH and in a lower biomass production.

FIG. 3 is a graphical representation of the effect of pH on phosphorus precipitation in an ATS system similar to that of the present invention, except that the pH of the water was allowed to increase without control, for demonstration purposes. The results were obtained during testing of an ATS sewage plant in Patterson, Calif., in a floway having a length of 500 ft. As the mean pH increased within the range of from about 9.27 to about 10.02, the precipitated phosphorus concentration, measured as a % of dry algal biomass, increased from about 1.61% to about 2.36%. At the same time the water concentration of phosphorus decreased from typical levels of between about 4 and 5 mg/1 to between about 0 and 2 mg/1. The graph shows that pH levels are more critical to phosphorus removal than are ambient concentrations of phosphorus. The present invention achieves such phosphorus removal beyond levels which had been heretofore possible. The invention allows the pH of only the portion of the water adjacent the algal cell walls to increase to the pH level at which a selected, predetermined pollutant will precipitate, while maintaining the pH of the water at a lower level, below the pH of precipitation the pollutant, thereby avoiding precipitation of the pollutant into the water rather than onto and/or into the algal cell walls.

Figure 5:
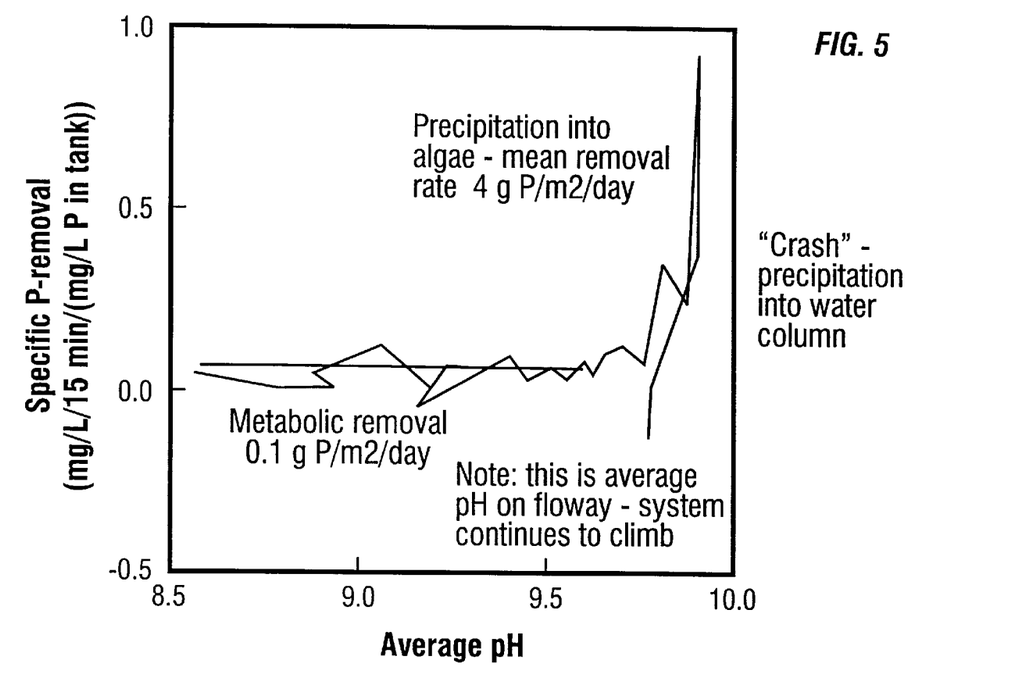
FIG. 5 is a graph of the relationship between average pH and specific P removal.
Figure 6:
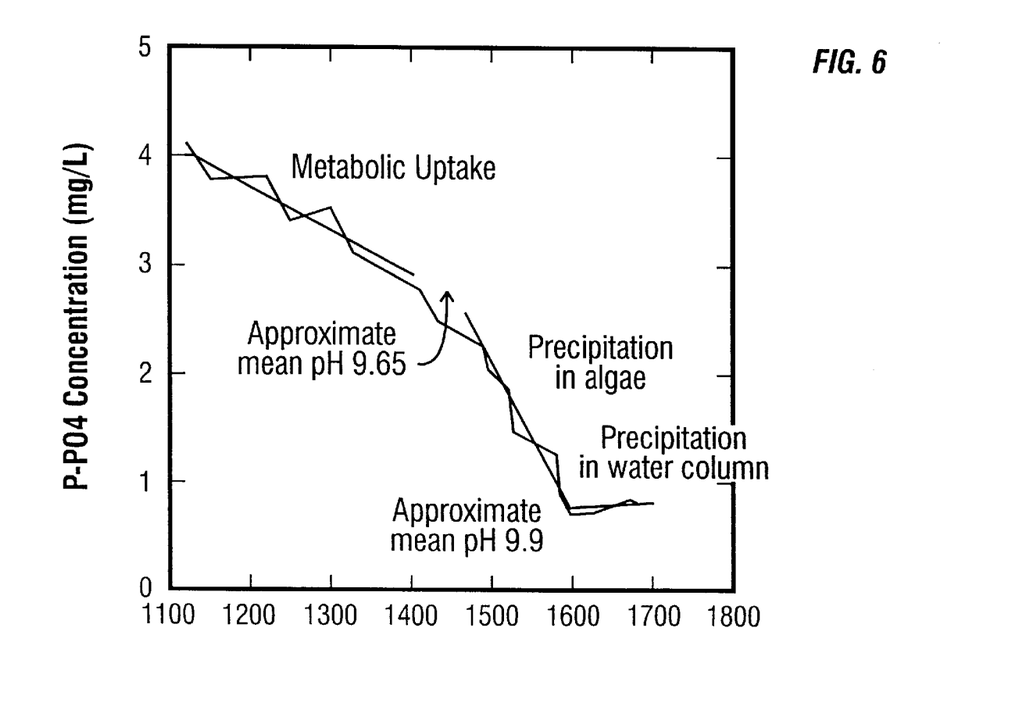
FIG. 6 is a graph of the relationship between time of day, pH and P concentration.

The method of the present invention may be better understood with reference to FIGS. 5 and 6. Both FIGS. 5 and 6 are derived from experimental work performed in accordance with the method of the present invention, except that the floway operating conditions were adjusted such that the pH of the water was allowed to rise without limit, for demonstration purposes. The experiments from which both FIGS. 5 and 6 are derived were performed in a floway through which a wastewater flows over an algal turf otherwise in accordance with the invention.

FIG. 5 is a graph derived from an experimental floway in which the pH was allowed to rise without limit. The graph shows specific phosphorus ("P") removal, in mg/L/15 minutes relative to the total mg/L P in the water source, shown on the Y-axis, plotted against the average pH of the water flowing over the algal turf, shown on the X-axis. The graph shows that while the pH is in the range up to about 9.5, phosphate ("$PO_4$") is removed by the metabolism of the algal turf (at the rate of about 0.1 g P/m$^2$/day). The graph shows that when the pH in this example reaches about 9.6, a dramatic increase in the rate of $PO_4$ removal is attained (at the rate of about 4.0 g P/m$^2$/day). This rate continues until the pH of the water in this example reaches about 9.9, at which time the $PO_4$ dissolved in the water precipitates generally into the water.

Phosphorus precipitates at a pH of 9.9, i.e., it has "a pH of precipitation" of 9.9 in the water of this example. Thus, the graph shows that when the pH of the water is less than 9.9, precipitation of $PO_4$ into the water does not occur, but when the pH of the water exceeds 9.9, precipitation of P into the water begins to occur.

The graph suggests that the pH of some portion of the water is 9.9 or higher during the period of enhanced removal of $PO_4$ from the water, since precipitation of $PO_4$ occurs during this interval onto and/or into the algal cell walls. The pH of the flowing water is low enough that no precipitation occurs into the water during the same interval. The object of the present invention is to obtain precipitation onto and/or into the cell walls of the algae forming the algal turf, without precipitating into the water, as a means of both removing the pollutants from the water and collecting the pollutants.

The graph in FIG. 6 shows P concentration in the water, in mg/L (P—$PO_4$, i.e., phosphorus measured as phosphate), on the Y-axis, plotted against time of day, in hours, on the x-axis, for the experimental system as described for FIG. 5. This graph shows that the concentration of $PO_4$ decreases at a roughly constant rate due to metabolic uptake until the pH of the water reaches a value of approximately 9.65, which in this example occurs between 1400 and 1500 hours. When the pH of the water rises above 9.65, the concentration of $PO_4$ decreases at a substantially higher rate. If, as shown to occur in this example, the pH of the water is allowed to increase to pH$\geq$9.9 (at about 1615 hours), a general precipitation into the water occurs and the decrease in concentration of $PO_4$ ceases (1615–1700 hours). Thus, FIG. 6 is consistent with FIG. 5 for phosphate removal from the water in this example.

Figure 7:
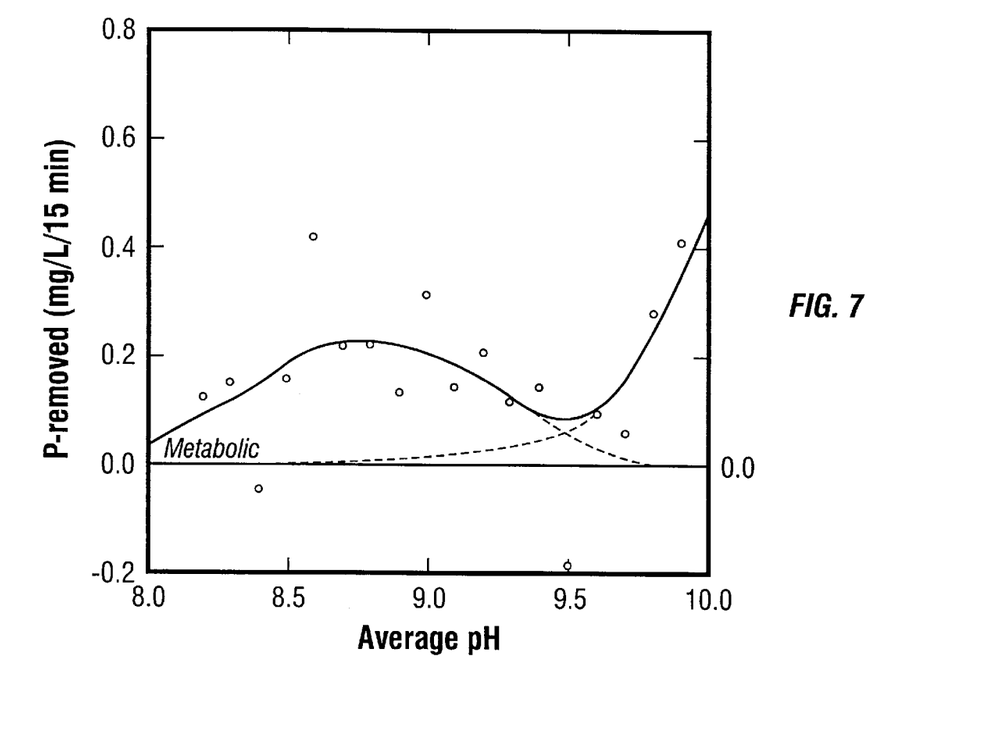
FIG. 7 is a graph of the relationship between P-removed and average water pH for a floway operating in accordance with the present invention.

The graph shown in FIG. 7 shows the relationship between P removal, in milligrams per liter per 15 minutes, and the average pH of the water in a floway operating in accordance with the present invention. The mark on the Y-axis just above the zero uptake baseline shows the average metabolic rate of P removal, about 0.025 mg/L/15 minutes, observed at a pH level below pH 8.0. As the pH in the graph increases, the rate of P removal reaches a first peak at a pH of approximately 8.75, followed by a decrease in the rate to a minimum at a pH of approximately 9.5, followed by a rapid increase in the rate as the pH increases above 9.5 toward a second peak. The dashed lines tailing away from the peaks represent the inferred rates of P removal due to each underlying type of P removal described in the following paragraphs.

The first maximum in the graph shown in FIG. 7, at approximately pH 8.75, is due to precipitation of P onto and/or into the cell walls of the algal turf, in accordance with the method disclosed and claimed herein. The maximum rate of P removal, at about pH 8.75, was about 0.22 mg/U15 min in this example. The preferred pH range for precipitating P onto and/or into the cell walls of the algae, in this example, ranges from about pH 8.3 to about pH 9.4. The decrease in rate of P removal above the maximum at pH 8.75 reflects the deleterious effects of increasing pH above about pH 8.75 on the efficiency of P removal due to precipitation onto and/or into the cell walls of the algal turf, for this example. The pH of maximum rate of P removal, the slope of the curve on either side of the maximum, and the maximum rate of P removal all may vary with changes in the particular water flowing through the floway. Such changes include variations such as initial pH, salt concentration, nutrient concentration, and the concentration of other species which may have an effect on the algae. The dashed line tailing away from this peak represents the inferred rate of P removal due solely to precipitation of P onto and/or into the cell walls of the algae as the pH continues to increase.

In the example shown in FIG. 7, the maximum rate of P removal increases rapidly after reaching a minimum at a pH of approximately 9.5. This increase in the rate of P removal is due to uncontrolled precipitation into the water, rather than substantially only onto and/or into the cell walls of the algae forming the algal turf. Such precipitation into the water is undesirable, since the P thus precipitated must be removed by other means, or the water must undergo a reduction in pH followed by another pass through the floway or another floway to repeat the P removal effort. The dashed line tailing away from this peak represents the inferred rate of P removal solely due to precipitation of P into the water rather than onto and/or into the cell walls of the algae at lower pH values.

As shown in FIG. 7, within the preferred range of pH for P removal by precipitation onto and/or into the cell walls of the algae, some small amount of precipitation into the water may occur. Thus, the term "substantially only onto and/or into the cell walls of the algae" means that while almost all P is removed by this route in the preferred pH range some small amount, perhaps a few percent, of the P may precipitate into the water, rather than onto and/or into the cell walls of the algae, within the meaning of this term as used herein.

Current costs of removal of phosphorus by chemical precipitation range from $0.50 to $4.50/gram, depending upon concentration. In present agricultural amelioration fields, marsh or STA (storm treatment area), systems are being developed that are regarded as being highly competitive, as compared to chemical methods, at low to moderate phosphorus concentrations. These systems can remove phosphorus at a cost of about $1.00/gram. In significant and unexpected contrast, large scale ATS systems operated according to the method of the present invention can remove phosphorus from wastewaters, at least in regions of the world between the latitude 40° parallels in which sufficient solar energy is available, at a cost of about $0.02/gram. This unexpected and very significant economic improvement over previous systems is attained by the method of the present invention. A very significant economic need has existed in the field of pollutant removal from natural water bodies for a very long time. While the need has been met to some degree, the known methods are both expensive and inefficient compared to the method of the present invention. Only much more expensive pollutant removal methods have heretofore been available for amelioration of, e.g., agricultural run-off. The present invention represents a significantly improved method for meeting this long-felt need.

It is contemplated that when practicing the present invention a continuous process can be achieved in which the water flows through the algal turf at a rate in the range of from about 100,000 to 300,000 gallons per day or greater, depending upon the size of the floway. Alternatively, the invention can be practiced as a batch process where the water is recycled a sufficient number of times until the desired level of removal of pollutants is achieved. In a batch process, contaminated or polluted water is pumped from a storage facility to the improved algal turf scrubber described herein and then returned to the storage facility. After a sufficient number of cycles, the relatively purified water is then pumped to another storage facility.

A significant additional use of the present invention is in the production of biomass. Biomass production is a secondary, but very advantageous, benefit of pollution scrubbing of wastewaters according to the present invention. The invention thus provides a method for producing a nutrient-laden biomass comprising the steps of providing algal spores for seeding, providing a source of water for flowing through a floway, providing a growing surface in the floway upon which the algal spores form an attachment, subjecting the algal spores in the floway to operating conditions resulting in the formation of an algal turf, adjusting the floway operating conditions, and harvesting a portion of the algal turf, preferably at intervals in the range of from about one to about two weeks. As stated above, the harvest interval is dependent on factors such as level of light available for photosynthesis, and may range to more than four weeks. In another embodiment of the invention, the production of nutrient-laden biomass is enhanced by subjecting the growing surface to water surge. Carbon dioxide, from sources described above, when added to adjust the pH of the water as described above, also functions as an added nutrient for the growing algae. Carbon dioxide may be added in this embodiment of the invention for the sole function of an added nutrient, together with or separate from its use to adjust pH. The present invention thus may be used primarily for the production of biomass from water rich in nutrients but low in other pollutants, as well as for the removal of pollutants generally.

The above description and drawings are only illustrative of a preferred embodiment which achieves the objects, features, and advantages of the present invention, and it is not intended that the present invention be limited thereto. Any modifications of the present invention which come within the spirit and scope of the following claims is considered part of the present invention.

What is claimed is:

1. A method for removing pollutants from water comprising the steps of:

providing algal spores;

providing a source of water, for flowing through a floway, said water containing a quantity of pollutants and having a pH on entry into said floway;

providing a growing surface in said water to which said algal spores form an attachment;

subjecting said algal spores to floway operating conditions so as to grow algae forming an algal turf in said water, said algal turf having a surface comprising cell walls;

adjusting the floway operating conditions such that a predetermined pollutant precipitates substantially only onto and/or into said cell walls rather than into the water; and harvesting a portion of said algal turf onto and/or into which said pollutants have precipitated.

2. The method of claim 1, wherein the pH of said water exiting from said floway has not substantially increased relative to the pH of said water entering said floway.

3. The method of claim 1, wherein the step of adjusting the floway operating conditions causes the pH of the water adjacent said cell walls to be above a pH of precipitation of the at least one pollutant.

4. The method of claim 1, further comprising subjecting said growing surface to water surge.

5. The method of claim 4 wherein said water surge is created by employing a dump scrubber.

6. The method of claim 1 wherein said step of adjusting the floway operating conditions comprises adjusting at least one of the water flow rate, light period, light intensity, light wavelength, water temperature, nutrient concentration and algal turf harvest rate.

7. The method of claim 1 wherein said step of adjusting the floway operating conditions comprises contacting said water with a gas containing carbon dioxide.

8. The method of claim 7 wherein said gas containing carbon dioxide is derived from stack gases.

9. The method of claim 7 wherein said gas is substantially pure carbon dioxide.

10. The method of claim 1 wherein said pollutants are selected from the group consisting of phosphorus, carbon, calcium, magnesium, iron, barium, and sulfur.

11. The method of claim 10 wherein said pollutant is phosphorus, and said precipitated pollutants are selected from the group consisting of hydroxyapatite, inorganic complexes containing phosphorus and organic complexes containing phosphorus.

12. The method of claim 11 wherein the harvested algal turf contains at least 2.0% total phosphorus per unit of dry weight of algae.

13. The method of claim 11 wherein the harvested algal turf comprises at least 1.5% phosphorus as phosphorus precipitated on the cell walls of said algae.

14. The method of claim 1 wherein said harvesting step includes allowing filamentous bases of said algae to remain on said growing surface after said harvesting step.

15. The method of claim 1 wherein said harvesting step is performed at intervals in the range of one to four weeks.

16. The method of claim 1 wherein said algae is selected from the group consisting of blue-green algae, green algae, brown algae, and red algae.

17. The method of claim 1 wherein said pollutants comprise heavy metals.

18. The method of claim 17 wherein said heavy metals are selected from the group consisting of cadmium, chromium, nickel, lead, mercury, copper, and zinc.

19. The method of claim 1 wherein said water is selected from the group consisting of sewage, municipal run-off, mining effluents, food processing waste waters, water from aquaculture control systems, and industrial and agricultural waste waters.

20. A method for removing pollutants from water comprising the steps of:

providing algal spores;

providing a source of water for flowing through a floway, said water containing a quantity of pollutants and having a pH lower than a pH of precipitation of said pollutants on entry into said floway;

providing a growing surface in said water to which said algal spores form an attachment;

subjecting said algal spores to floway operating conditions so as to grow algae forming an algal turf in said water, said algal turf having a surface comprising cell walls;

adjusting the floway operating conditions such that a predetermined pollutant precipitates onto and/or into said cell walls whereby said water exiting said floway contains a decreased quantity of pollutants and the pH of said water exiting said floway has not substantially increased relative to said water entering said floway;

harvesting a portion of said algal turf onto and/or into which said pollutants have precipitated.

21. A method as in claim 20 wherein said pollutant comprises a quantity of phosphate ion, and said water exiting said floway contains a decreased quantity of phosphate ion relative to said water entering said floway.

22. A method for removing pollutants from water comprising the steps of:

providing algal spores;

providing a source of water for flowing through a floway, said water having a pH and containing a quantity of at least one pollutant on entry into said floway, each said pollutant having a pH of precipitation;

providing a growing surface in said floway to which said algal spores form an attachment;

subjecting said algal spores to floway operating conditions so as to grow algae forming an algal turf in said water, said algal turf having a surface comprising cell walls;

adjusting the floway operating conditions such that the pH of said water is lower than said pH of precipitation, and at least one said pollutant precipitates from said water only onto and/or into said cell walls;

harvesting a portion of said algal turf onto and/or into which said pollutants have precipitated.

23. A method as in claim 22, wherein the water exiting said floway contains a decreased quantity of at least one said pollutant and the pH of said water exiting said floway has not substantially increased relative to said water entering the floway.

24. A method as in claim 22, wherein said at least one pollutant comprises phosphate and has a pH of precipitation of about 9.9.

25. The method as in claim 22, wherein said water exiting from said floway does not exceed said pH of precipitation of said at least one pollutant.

* * * * *